United States Patent [19]

Wilson et al.

[11] Patent Number: 5,037,785

[45] Date of Patent: Aug. 6, 1991

[54] CATALYST REGENERATION PROCESS USING LASER RADIATION

[75] Inventors: Michael F. Wilson, Ottawa; Thomas M. Steel, Downsview; Walter W. Duley, King City, all of Canada

[73] Assignee: Her Majesty in the Queen Right of Canada as represented by the Minister of Energy, Mines and Resources, Ottawa, Canada

[21] Appl. No.: 438,634

[22] Filed: Nov. 17, 1989

[51] Int. Cl.$^5$ .............. B01J 37/34; B01J 38/14; C10G 45/08
[52] U.S. Cl. .................. 502/5; 204/157.41; 208/108; 208/111; 208/140; 208/144; 208/216 R; 208/254 H; 502/38; 502/522
[58] Field of Search ............ 502/5, 38–43, 502/522; 204/157.41, 157.51, 157.61

[56] References Cited

U.S. PATENT DOCUMENTS

| | | | |
|---|---|---|---|
| 2,758,098 | 8/1956 | Haensel | 502/34 |
| 4,012,301 | 3/1977 | Rich et al. | 204/157.41 |
| 4,124,466 | 11/1978 | Morrey | 204/157.41 |
| 4,144,189 | 3/1979 | Kirkbridge | 252/414 |
| 4,551,437 | 11/1985 | Berrebi | 502/522 |
| 4,849,199 | 7/1989 | Pinneo | 423/446 |
| 4,970,397 | 11/1990 | Green et al. | 502/522 |

FOREIGN PATENT DOCUMENTS

| | | |
|---|---|---|
| 0128302 | 12/1984 | European Pat. Off. . |
| .0202911 | 11/1986 | European Pat. Off. . |
| 1105224 | 7/1984 | U.S.S.R. .............. 502/38 |

*Primary Examiner*—Paul E. Konopka
*Attorney, Agent, or Firm*—Darby & Darby

[57] ABSTRACT

A process for regeneration of a deactivated hydroprocessing catalyst is provided. The process comprises exposing the catalyst to laser radiation in the presence of an oxidizing gas. The process may be used to regenerate supported or unsupported metal catalysts which have been fouled by coking.

23 Claims, 4 Drawing Sheets

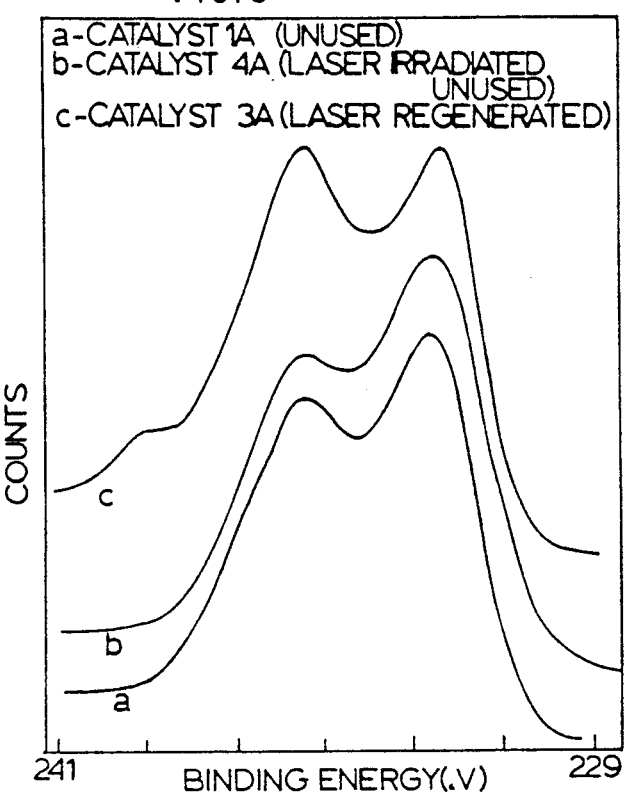
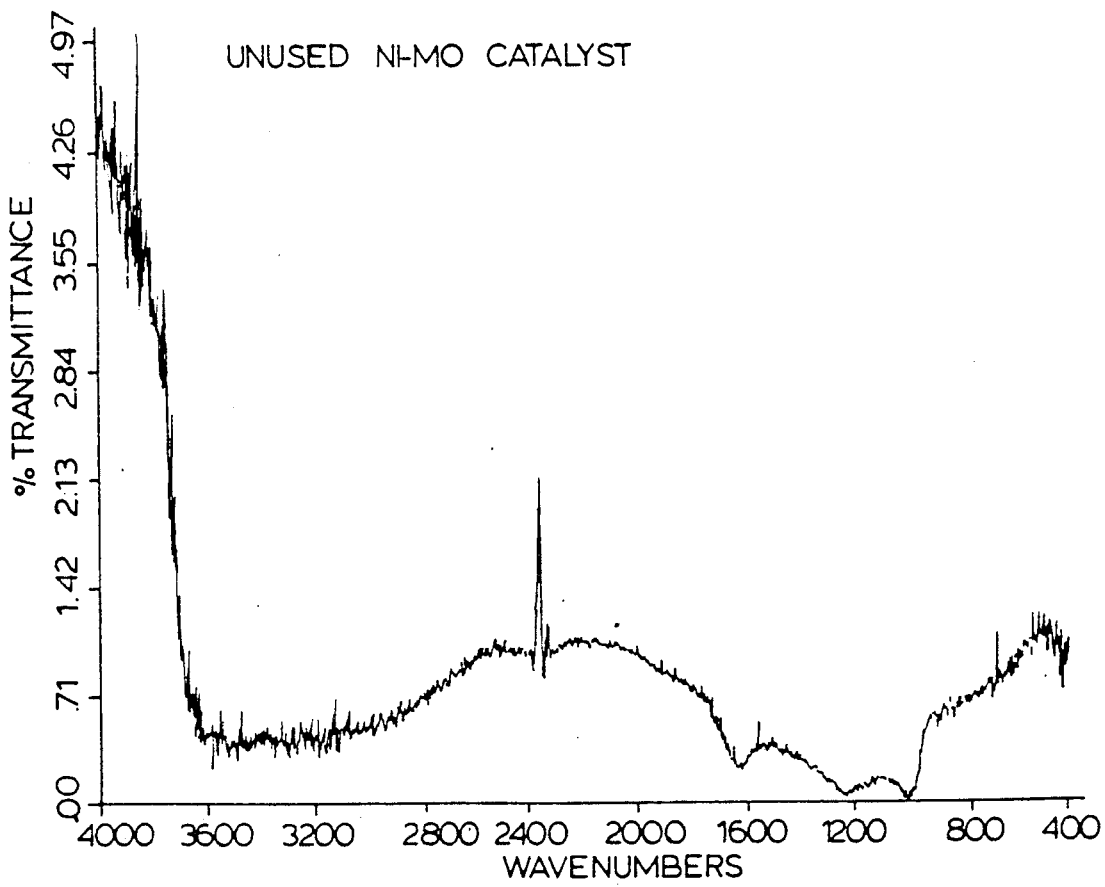

CATALYST REGENERATION PROCESS USING LASER RADIATION

FIELD OF THE INVENTION

The present invention relates to a process for regenerating a deactivated hydroprocessing catalyst.

BACKGROUND OF THE INVENTION

The use of hydroprocessing catalysts in the petroleum industry is known and is well documented. Generally, hydroprocessing catalysts encompass both hydrotreating and hydrocracking catalysts. Typically, hydrotreating catalysts are utilized to facilitate removal of organosulphur and nitrogen compounds from refinery feedstocks as a treatment step prior to quality assessment of the final fuel product. Similarly, hydrocracking catalysts may be used in processes for converting gas oils to transportation fuels and for refining lube oils. The cost associated with these catalysts (i.e. the cost of obtaining/purchasing and of using the catalysts) represents the major cost associated with the conversion of primary hydrocarbons to refined fuel products.

Hydroprocessing catalysts generally comprise molybdate and/or tungstate catalysts promoted by nickel and/or cobalt and supported on an inert material, usually gamma alumina. Typically, commercial hydroprocessing catalysts are prepared by supporting the active metal oxides (e.g. $MoO_3$, $WO_3$) on $\gamma$-$Al_2O_3$. This supporting process may involve successive impregnation/calcination steps followed by promotion with CoO or NiO. After loading into a reactor, the catalysts are activated for hydroprocessing operations by a sulphidation step which serves to convert the supported metal oxide-based catalyst to the more stable metal suphide-based (e.g. $MoS_2$, $WS_2$) catalyst. During hydroprocessing, the catalyst activity is usually sustained by the presence of organosulphur compounds in the feedstocks. These compounds supply sulphur to the catalyst through hydrogen sulphide ($H_2S$) formation.

As the price of crude oil has declined in recent years, petroleum refiners in general and synthetic crude oil producers in particular have been devoting considerable effort toward developing techniques by which process efficiency will be increased and/or overall process costs will be decreased.

Consideration has been given to developing processes for regenerating deactivated or spent hydrotreating catalysts. Bogdanor et al (*Ind. Eng. Chem. Prod. Res. Dev.* 1986, 25, 220-230) teach that deactivation of hydrotreating process occurs in at least four different ways:

(i) fouling by depositing of coke, ash and metals;
(ii) sintering of the support with consequent loss of surface area;
(iii) agglomeration of active metals; and
(iv) poisoning of active sites on catalysts (usually by metals contained in feedstock).

Of these, it is believed that fouling is the major cause of deterioration in catalyst performance. Fouling involves the deposition of carbonaceous matter on the catalyst surface (usually referred to as coke). This has at least two deleterious results: (a) physical blockage of the catalytically active surface sites and, on a larger scale, (b) plugging of catalyst pores such that diffusion of the feedstock through the pores to the active sites is impeded. Coke fouling of catalytic sites usually occurs via adsorption of certain molecular species (referred to as coking precursors) which are bound strongly to the sites and may be easily polymerized and/or condensed to form large molecular structures.

Excessive operating temperatures may cause sintering and/or agglomeration of hydrotreating catalysts through crystal growth. Sintering is an irreversible phenomenon whereas redispersion of agglomerated metals is practised industrially.

Catalyst poisoning by metals usually involves contamination of the active sites by, for example, lead, arsenic and sodium contained in the feedstock being treated. Catalyst poisoning differs from fouling in that the former represents a chemical interaction of the feedstock material with the catalyst surface, whereas the latter is a physical phenomenon.

Some of the largest producers of synthetic crude oil may be found in Alberta, Canada. Since hydroprocessing operations in synthetic fuels production involves exposing the catalyst to more severe operating regimes than those used in conventional crude oil refining processes, the hydroprocessing catalysts used by synthetic fuel producers may be considered as a higher risk investment. Upgraded bitumen from fluid and delayed coking operations usually requires hydrotreating prior to blending of distillate streams and pipelining as synthetic crude oil. In such a case, the hydrotreating processes may be used to remove sulphur and nitrogen heteroatoms, and to saturate olefins and some aromatics in naphtha and gas oil coker distillates. Alternatively, the catalysts may be used in refinery hydrocracking operations for upgrading synthetic crude gas oils and lube oils. In such a case, more severe reactions conditions are required with the result that the catalysts may experience considerable fouling (i.e. coking) during the operating cycle.

As used throughout this specification, the term "hydroprocessing catalyst" is meant to encompass catalyst which are deactivated by coke fouling. Nonlimiting examples of such catalysts are those used for hydrotreating hydrodesulphurization, hydrodenitrogenation, and hydrogenation of olefins and aromatics), hydrocracking, gasoline reforming, selective hydrogenation of pyrolysis gasolines, and those used as molecular sieves.

Generally, efficient and successful operation of a commercial hydroprocessing unit involves maintenance of maximum feedstock conversion levels throughout the lifetime of the active catalyst. As the catalyst slowly deactivates, the process temperature is systematically ramped upwardly until the catalyst activity is substantially exhausted—i.e. the catalyst is deactivated or spent. If the appropriate precautionary steps are taken, the catalyst will be reversibly deactivated—i.e. it will be fouled. In this type of operating cycle, catalyst lifetime will typically vary from six to eighteen months depending on feedstock composition and operating conditions. Generally, hydroprocessing light petroleum fractions permits a longer catalyst lifetime when compared to hydroprocessing heavy gas oils. The frequency of reactor downtime is related to the activity and/or the lifetime of the catalyst and to the composition of the feedstock material.

BRIEF DESCRIPTION OF THE PRIOR ART

Fouled hydroprocessing catalysts may be regenerated by burning off surface carbon via an oxidative regeneration process. Typically, such a regeneration process involves reaction of the deactivated catalyst in the presence of an oxidizing air stream (usually air or air diluted with nitrogen) in a high temperature furnace.

Furimsky (*Applied Catalysis*, 44 (1988) 189-198) teaches that catalysts used to hydrotreat light or medium distillate fractions may be regenerated to a greater extent than catalysts used to treat heavy residues. Moreover, this reference teaches that, in a conventional catalyst regeneration process (i.e. high temperature burn-off), the initial contact between the coke molecules on the catalyst surface and the oxidizing medium may result in uncontrollable overheating and possibly sintering of the catalyst. This should be avoided as it can result in permanent and undesirable changes to the catalyst rendering it unusable.

Yoshimura and Furimsky (*Applied Catalysis*, 23 (1986) 157-171) teach that, in conventional oxidative catalyst regeneration processes, temperatures as high as 500° C. may be required to burn off the carbonaceous material from the catalyst surface. The potential problems associated with exposing hydrotreating catalysts to high temperatures is discussed above.

U.S. Pat. No. 2,758,098 (to Universal Oil Products Company) teaches a process for regeneration of platinum-containing catalysts which have been rendered relatively inactive as a result of use in a hydrocarbon conversion process. Generally, the process encompasses periodically contacting the spent catalysts with carbon dioxide at temperatures of from 1100° to 1400° F. (i.e. from 594° to 760° C.) for a period of time sufficient to render the catalyst active. It is interesting to note that the residence time required to regenerate the catalyst utilizing the subject process is on the order of one hour or more. Essentially, this reference teaches a conventional high temperature, long residence time, oxidative catalyst regeneration process. Notwithstanding the required residence time (which decreases efficiency of regeneration process , the disadvantage of exposing catalysts to high temperatures is discussed above.

It should be appreciated that conventional high temperature oxidative catalyst regeneration processes generally do not result in restoration of the catalyst to the original level of activity. After each time the catalyst is regenerated, the restored catalyst can usually only be used for a shorter period of time before requiring further regeneration. It is likely that this is due to an unavoidable degree of sintering of the catalyst which is associated with many conventional high temperature oxidative regeneration processes. Thus, using such a process to regenerate the catalyst results in a definite limit of catalyst lifetime.

It is an object of the present invention to provide a process for the regeneration of deactivated hydroprocessing catalysts which obviates or mitigates the above-mentioned disadvantages of the prior art.

It is another object of the present invention to provide a hydroprocessing catalyst regeneration process during which the occurrence of catalyst overheating is minimized or substantially eliminated.

SUMMARY OF THE INVENTION

Accordingly, the present invention provides a process for regenerating a deactivated hydroprocessing catalyst which comprises exposing said catalyst to laser radiation in the presence of an oxidizing gas. The type of laser radiation utilized in the process is not particularly restricted.

The hydroprocessing catalyst suitable for use in the present process is one which has been substantially deactivated by fouling. Thus, in accordance with the present process, carbonaceous material (e.g. coke) is removed from the catalyst surface via photo-thermally induced chemical reaction of the material with the oxidizing gas.

BRIEF DESCRIPTION OF THE DRAWINGS

Embodiments of the present invention will be described with reference to the accompanying drawings, in which:

FIG. 5 is an X-ray photoelectron spectrum of three hydroprocessing catalysts;

FIG. 6 is an infrared spectrum of an unused hydroprocessing catalyst;

DETAILED DESCRIPTION OF THE INVENTION

Figure 1:
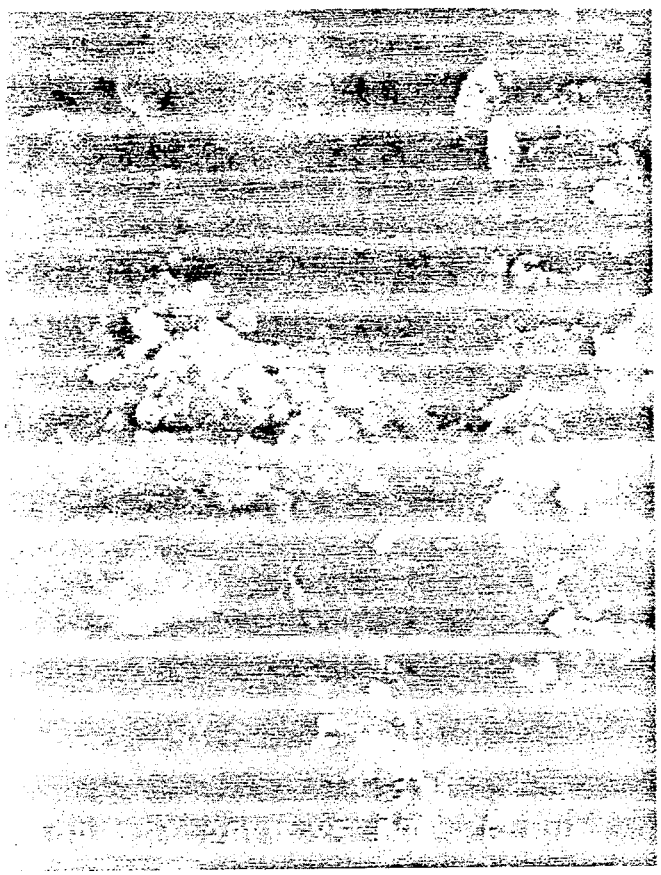
FIG. 1 is a scanning electron micrograph of an unused hydroprocessing catalyst.

The process of the present invention provides an improved method of hydroprocessing catalyst regeneration which may be used to avoid at least some of the disadvantages associated with the prior art processes discussed above. Thus, the present invention contemplates exposing a deactivated catalyst to radiation from a laser in the presence of an oxidizing gas.

The deactivated hydroprocessing catalyst is typically in the form of particles and may comprise extrudates, spheres, trilobes or quadrilobes. Preferably, the deactivated hydroprocessing catalyst is regenerated in a reactor which is adapted to allow for agitation or movement of the particles such that complete and even surface exposure to the laser radiation is facilitated. The residence time during which the catalyst is exposed to the laser radiation depends, in part, on the size of the catalyst particles and the vigour with which they are agitated. For example, use of a batch of small catalyst particles (i.e 20-50 mesh) in conjunction with agitation will necessitate a relatively short exposure time, typically on the order of from about 1 to about 3 seconds. Given the particle size, the required exposure time can be readily determined by a person skilled in the art.

Alternatively, the catalyst may be of the type which is deposited on or adhered as a coating to the surface of a substrate. For example, the catalyst may form a thin coating (e.g. from 10 to 100 $\mu$m) on a flat metal substrate. In such a case, the catalyst may be regenerated very efficiently (i.e. relatively short exposure time to laser radiation) since agitation would not be required.

Although not wishing to be bound by any particular theory or mode of operation, the Applicants believe that carbonaceous matter (e.g. coke) is removed from the surface of the catalyst via photo-thermally induced chemical reaction between the matter and the oxidizing gas.

The term "oxidizing gas" as used in this specification is intended to include a pure oxidizing gas and composite gas mixtures comprising an oxidizing gas. A non-limiting example of a suitable oxidizing gas is oxygen. In most applications, the use of pure oxygen is relatively hazardous due to its highly inflammable nature. Thus, it is preferred to use an oxidizing gas comprising from about 15 to about 25 weight percent of oxygen. A particularly preferred embodiment of the present process encompasses the use of air (typically comprising from about 20 to about 21 weight percent of oxygen) as the oxidizing gas. It should be appreciated that the temperature of the reaction between the oxidizing gas and the carbonaceous matter may be controlled to a certain degree by controlling the inflow of oxidizing gas. Such control, which can be instituted as an in-process refinement, is within the capabilities of a person skilled in the art.

As stated above, the hydroprocessing catalyst suitable for use in the process of the present invention is one which has been substantially deactivated by fouling. The type of hydroprocessing catalyst suitable for use in the process of the present invention is not particularly restricted. Many hydroprocessing catalysts are available commercially. The preferred catalysts include supported metals or metal sulphides, on a suitable support material. Suitable metal sulphides include molybdenum and tungsten sulphides, preferably promoted by sulphides of cobalt or nickel. Non-limiting examples of suitable metals include iron, chromium, cobalt, nickel, ruthenium, rhodium, palladium, iridium, rhenium and platinum. Non-limiting examples of suitable support materials include alumina, silica, silica-alumina, titania and cerium oxide—the preferred support material is alumina.

The type of laser radiation used in the process of the present invention is not particularly restricted provided that the radiation is absorbed by the fouled catalyst to be regenerated. For example, the laser radiation may be generated from a laser of the $CO_2$, YAG or Excimer variety. Preferably, the radiation is generated from a $CO_2$ laser. The laser radiation may be pulsed, continuous wave (hereinafter referred to as CW) or pulsed CW. Preferably, the radiation is pulsed CW. The most preferred laser radiation is generated from a CW $CO_2$ laser operated in pulse mode.

Preferably, a particular catalyst particle is exposed to the laser radiation for a period of from about 1 microsecond to about 100 milliseconds, more preferably from about 100 microseconds to about 10 milliseconds. The wavelength of the laser radiation is preferably from about 200 nm to about 10,000 nm, more preferably from about 1,000 nm to about 10,000 nm. Preferably, the laser is operated at a fluence regime of from about 10 to about 1000 $J/cm^2$, more preferably from about 20 to about 100 $J/cm^2$. The intensity of the laser beam is preferably from about 10 $W/cm^2$ to about 1 $MW/cm^2$.

Embodiments of the invention will now be described with reference to the following Examples which are provided for illustrative purposes and should not be construed as limiting.

LASER REGENERATION OF DEACTIVATED CATALYSTS

A series of experiments were conducted to determine the effects of the present regeneration process on the physical, surface and bulk chemical properties of two different spent commercial hydroprocessing catalysts. Deactivated (fouled) catalyst samples were prepared for laser regeneration by de-oiling in toluene, drying in air at a temperature of from 50° to 70° C. Thereafter, the dried 1/16 inch catalyst extrudates were ground and sieved to a 20–50 mesh particle size.

Oxidative regeneration of the coked catalyst surface was conducted by placing the catalyst particles in a sample holder. Radiation from a CW $CO_2$ laser was directed on to the particles while an oxidizing gas (in this case air) was passed over the surface of the catalyst particles. The reaction products were flushed out of the sample system allowing replenishment of the air (and thus oxygen) supply to the reaction zone by gas flow. Agitation of the catalyst particles facilitated greater exposure to the laser radiation thereby leading to more efficient coke burn-off.

In these experiments, use was made of a Lumonics VFA 1700 CW $CO_2$ laser which was operated in a pulse mode with 0.5 ms pulses. The pulse repetition frequency was varied to obtain the desired average power. At a frequency of 1000 Hz the laser power was typically 50 W. Generally, the catalyst regeneration process was conducted at an average power of about 40 W, without focussing. Under such conditions, with a laser beam diameter of 1.4 cm, the laser intensity was about 26 $W/cm^2$. The catalyst particles were exposed to the laser radiation whereby the batch process time was about one second.

CHARACTERIZATION OF CATALYSTS

Physical characterization of ground catalyst samples before and after deactivation and regeneration was conducted utilizing mercury porosimetry analysis. Thus, using a Micromeritics Auto-Pore 9200 mercury porosimeter, pore volume and pore area of the catalyst were readily determined.

Structural changes to the catalyst surface were detected and observed utilizing a scanning electron microscope (hereinafter referred to as "SEM"). Specifically, use was made of a Hitachi model S520 SEM with a primary electron beam energy of 25 KeV. To avoid charging, catalyst samples were coated with a vapour deposited Au-Pd conductive film approximately 150 Å thick.

Chemical analysis of the catalyst surface was conducted utilizing X-ray photoelectron spectroscopy (hereinafter referred to as "XPS"). Specifically, spectra were recorded with a Surface Science SSX-100 spectrometer using monochromatized Al K$\alpha$ X-ray radiation with an electron beam energy of 10 kV. The binding energy scale of the spectrometer was calibrated using gold foil (Au $4f_{7/2}=83.9$ eV). The samples were mounted on grooved indium foil. The base pressure of the analytical chamber was approximately $10^{-10}$ Torr.

In addition to using XPS, chemical analysis of the catalyst surface was conducted utilizing proton-induced X-ray emission spectroscopy (hereinafter referred to as PIXE spectroscopy). Specifically, the spectra were recorded using a General Ionex 4 MeV Tandem Accelerator with a proton beam energy of 1.650 MeV and a Si-Li detector. For samples to be tested the beam intensity was set at a count rate of 75 $sec^{-1}$. The catalyst samples were analyzed "as-is" without further preparation.

Fourier transform infrared (FTIR) spectroscopy was utilized to obtain chemical analysis of the catalyst and thereby complement the XPS surface analysis discussed above. Specifically, the FTIR spectra were obtained that laser regeneration does not significantly alter the morphology of the catalyst surface.

TABLE 1

| POROSIMETRY DATA | Co-Mo/$\gamma$-Al$_2$O$_3$ CATALYST | | |
|---|---|---|---|
| | 1A-UNUSED | 2A-FOULED | 3A-LASER REGENERATED |
| TOTAL PORE VOLUME (mL/g) | 0.43 | 0.33 | 0.46 |
| TOTAL PORE AREA (m$^2$/g) | 213.0 | 167.5 | 195.1 |
| MEDIUM PORE DIAMETER (um) | 0.0082 | 0.0082 | 0.0093 |
| BULK DENSITY (g/mL) | 1.280 | 1.348 | 1.241 |
| SKELETAL DENSITY (g/ml) | 2.861 | 2.401 | 2.849 | using a Nicolet 20 SX FTIR spectrometer with a diffuse reflectance attachment. Thus, the spectra were obtained at a resolution of about 0.5 cm$^{-1}$ and were the average of 100 scans.

EXAMPLE 1

Co-Mo/$\gamma$-Al$_2$O$_3$ was designated as Catalyst A, which was deactivated by conducting semi-pilot plant hydrotreating experiments. The catalyst was deactivated (fouled) by severe hydrogenation of a synthetic crude middle distillate fraction according to the following procedure.

The feedstock was distilled from synthetic crude at a boiling range of from 142° to 333° C. 70 g of Catalyst A was loaded into a bench-scale continuous flow reactor and after sulphiding with 10% H$_2$S in hydrogen for two hours at a temperature of 380° C., liquid feedstock and hydrogen were passed through a mixer and over the fixed catalyst bed. The hydrogen pressure was fixed at 2500 psig and liquid space velocity was varied from 0.75 to 2.25 h$^{-1}$. The reactor was run for seventy hours during which the temperature was varied from 340° to 440° C. After completion of the run, the catalyst was recovered, de-oiled, ground and sieved to a 20–50 mesh particle size as described above.

Unused, fouled (coked) and laser regenerated samples of Catalyst A were designated Catalyst 1A, 2A and 3A, respectively. The physical characteristics of Catalysts 1A, 2A and 3A were determined by mercury porosimetry and are provided in Table 1. As shown in Table 1, where comparisons are made between Catalyst 1A and Catalyst 2A, the effects of coking are evident in the results for the latter with regard to total pore volume and total pore area. The physical characteristics for Catalyst 3A (laser regenerated) shown in Table 1 indicate that, within experimental error, the total pore volume and total pore area have been completely restored when compared to the respective values obtained for Catalyst 1A (unused).

Figure 2:
FIG. 2 is a scanning electron micrograph of a fouled hydroprocessing catalyst.
Figure 3:
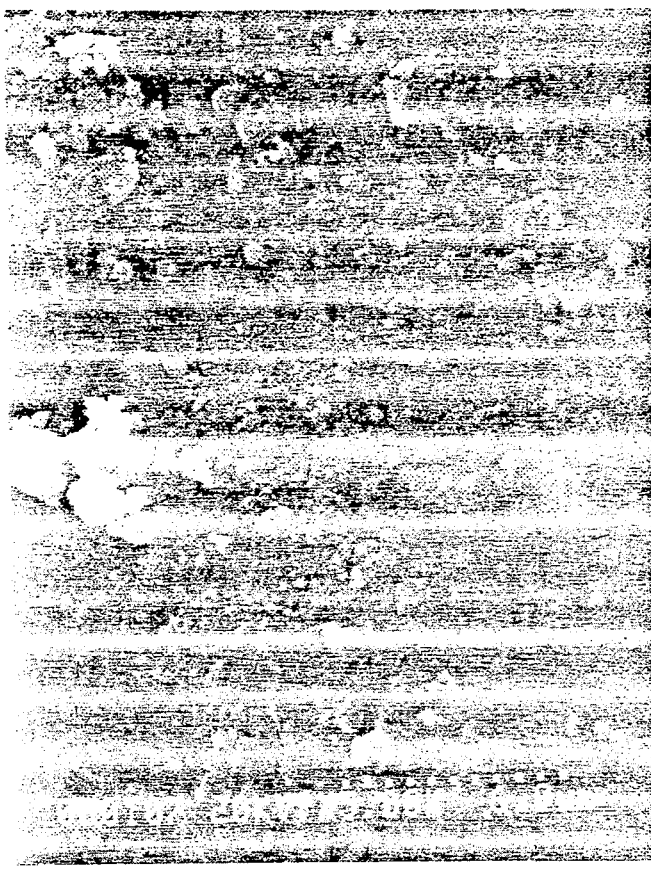
FIG. 3 is a scanning electron micrograph of a hydroprocessing catalyst which has been regenerated according to the present process.
Figure 4:
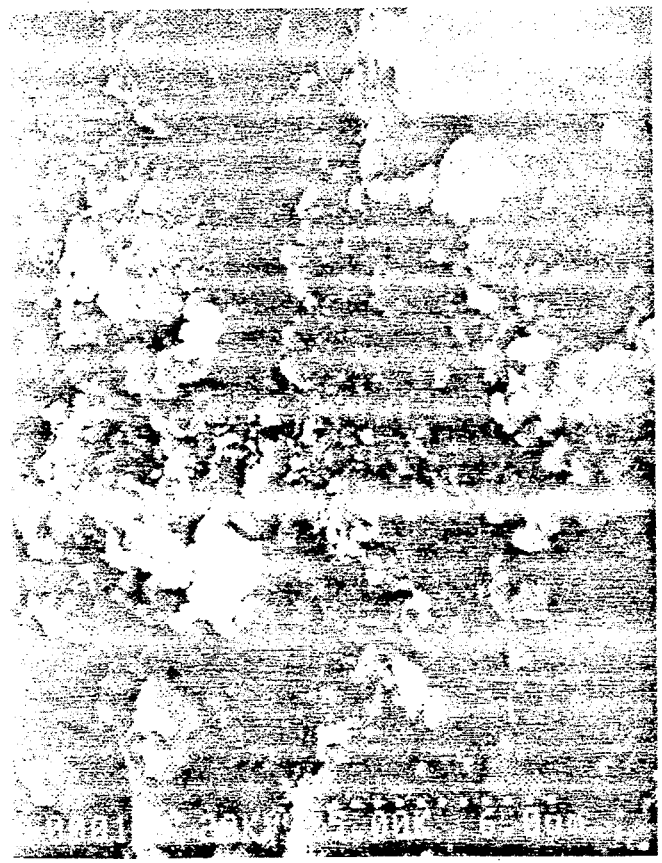
FIG. 4 is a scanning electron micrograph of an unused, laser irradiated hydroprocessing catalyst.

Reference will now be made to FIGS. 1, 2 and 3 which illustrate scanning electron micrographs of Catalysts 1A (unused), 2A (fouled) and 3A (laser regenerated), respectively. In addition, FIG. 4 is provided and illustrates a laser irradiated unused Co-Mo/$\gamma$-Al$_2$O$_3$ catalyst (hereinafter referred to as "Catalyst 4A"). From these Figures, it is evident that the surface microstructure of Catalyst 4A is unchanged by laser irradiation alone. Moreover, laser processing of the Catalyst 2A (fouled) to yield Catalyst 3A (laser regenerated) leads to a restored catalyst surface which closely resembles the surface of Catalyst 1A (unused). Thus, micropores visible in the Catalyst 1A (unused) are still present in Catalyst 3A (laser regenerated) and Catalyst 4A laser irradiated unused). From these results, it is apparent Surface chemical analysis was conducted on Catalysts 1A (unused) and 3A (laser regenerated) using XPS. The results of this analysis are provided in Table 2. As shown in Table 2, there are no significant differences between Catalyst 1A (unused) and Catalyst 3A (laser regenerated) in the surface concentrations of the active phases (i.e. Co and Mo) or of the support material (i.e. Al and O). The data provided in Table 2 for "C 1s" is representative of the content of carbon contaminant on the catalyst surface. From these results it is apparent that laser regeneration may be used to achieve removal of surface carbonaceous material from the catalyst while leaving the composition of the active surface metal components substantially unchanged.

Reference will now be made to FIG. 5 which illustrates XPS spectra for Catalysts 1A (unused), 3A (laser regenerated) and 4A (laser irradiated unused). As shown in FIG. 5, there is one dominant Mo oxidation state in the region of the Mo 3d binding energy for Catalyst 1A (unused). The position of the 3d$_{5/2}$ component of this spin-orbit doublet at a binding energy of 232.8 corresponds to Mo$^{6+}$. Demanet et al (*Appl. Surf. Sci.*, 14, 271 (1983)) teach that this is indeed the common state of molybdenum in these catalysts after calcining at moderate temperatures (e.g. from 350° to 500° C.) in air. With reference to Catalyst 4A (laser irradiated unused), exposure of unused catalyst to laser radiation did not lead to the formation of new oxidation states or to compounds with Co or with the support material. If such new oxidation states or compounds were formed, one would have expected to observe, for example, peaks at lower binding energy corresponding to CoMoO$_4$ or Al$_2$(MoO$_4$)$_3$. With reference to Catalyst 3A (laser regenerated), FIG. 5 illustrates that the regenerated catalyst comprises substantially all of the Mo as Mo$^{6+}$ (i.e. binding energy of 232.8). From these results, it is apparent that laser regeneration of the hydroprocessing catalyst did not result in significant alteration of the catalyst surface.

TABLE 2

SURFACE COMPOSITION (% Relative Intensity) DETERMINED BY XPS SPECTROSCOPIC ANALYSIS

| Co-Mo/$\gamma$-Al$_2$O$_3$ Catalyst | Co 2p$_{3/2}$ | Mo 3d$_{5/2}$ | Al 2p | O 1s | C 1s |
|---|---|---|---|---|---|
| 1A. (Unused) | 0.73 | 2.98 | 30.55 | 58.94 | 6.80 |
| Unused* | 0.55 | 2.37 | 30.28 | 57.20 | 9.59 |
| 3A. (Laser Regenerated) | 1.15 | 2.70 | 30.24 | 56.07 | 9.83 |

*duplicate analysis of unused catalyst

The results of PIXE spectroscopic analysis of Catalysts 1A (unused), 2A (fouled), 3A (laser regenerated and 4A (laser irradiated unused) are provided in Table 3. These illustrate that upon fouling, the catalyst bears relatively reduced amounts of support (i.e. Al) and active (i.e. Mo and Co) phases —compare Catalyst 1A with Catalyst 2A. This is not unexpected since coke fouling adds mass to the catalyst (i.e. carbon and sulphur) thereby reducing the relative amounts of other catalyst constituents. However, upon regeneration according to the present process, the concentration of the active and support phases of the catalyst are restored. Thus, the present process removes surface carbonaceous matter and sulphur contained therein and does not lead to significant changes and/or modifications to the surface concentrations of the active catalytic phases.

changes in the surface concentrations of the active phases (i.e. Ni and Mo) or of the support material (i.e. Al and O).

Figure 7:
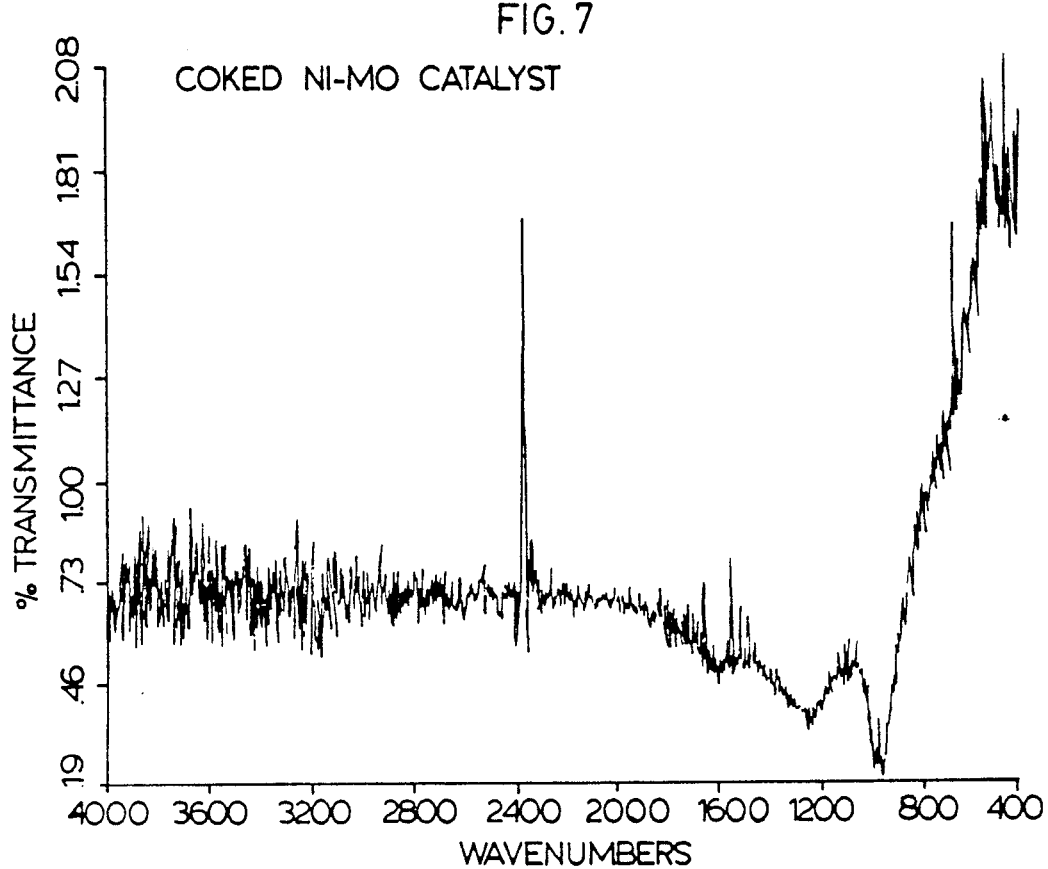
FIG. 7 is an infrared spectrum of a fouled hydroprocessing catalyst.
Figure 8:
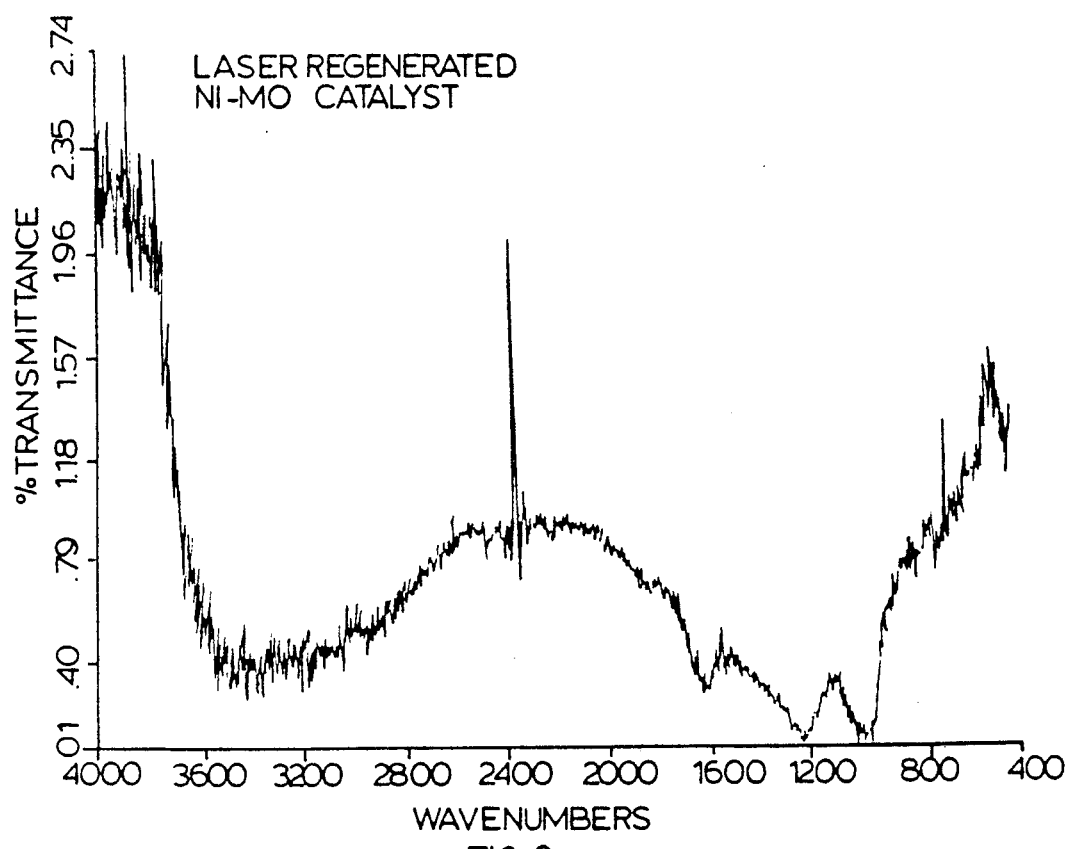
FIG. 8 is an infrared spectrum of a hydroprocessing catalyst which has been regenerated according to the present process.

Reference will now be made to FIGS. 6, 7 and 8 wherein there are illustrated FTIR spectra of Catalysts 1B (unused), 2B (fouled) and 3B (laser regenerated), respectively. As shown in FIG. 6, the spectrum for Catalyst 1B (unused) contains a strong absorption band at about 1000 cm$^{-1}$ and a broad absorption band at about 3600 cm$^{-1}$. Lipsch et al (*J. Catal.*, 15, 174-178 (1969)) have shown that these two absorption bands are characteristic of $MoO_3$ supported on $\gamma$-$Al_2O_3$.

TABLE 4

| POROSIMETRY DATA | Ni-Mo/$\gamma$-$Al_2O_3$ CATALYST | | |
|---|---|---|---|
| | 1B-UNUSED | 2B-FOULED | 3B-LASER REGENERATED |
| TOTAL PORE VOLUME (mL/g) | 0.37 | 0.25 | 0.37 |
| TOTAL PORE AREA (m$^2$/g) | 177.3 | 123.9 | 119.7 |
| MEDIUM PORE DIAMETER (um) | 0.0093 | 0.0082 | 0.0123 |
| BULK DENSITY (g/mL) | 1.389 | 1.525 | 1.412 |
| SKELETAL DENSITY (g/ml) | 2.839 | 2.439 | 2.978 |

EXAMPLE 2

Ni-Mo/$\gamma$-$Al_2O_3$ (commercially available as Shell 424) was designated as Catalyst B and was deactivated through use in an industrial hydrotreating unit for upgrading syncrude naphtha coker distillate. Prior to its use in this Example, Catalyst B had been regenerated twice using a conventional industrial oxidative regeneration process. Prior to regeneration, the catalyst had been run for an approximately 18-month cycle in the commercial trickle bed hydrotreating reactor (above) with constant ramping of temperature from about 340° to about 400° C.

TABLE 3

| MASS CONCENTRATION (%) DETERMINED BY PIXE SPECTROSCOPIC ANALYSIS | | | | | |
|---|---|---|---|---|---|
| Co-Mo/$\gamma$-$Al_2O_3$ CATALYST | Al | P | S | Co | Mo |
| 1A | 37.91 | 0.867 | 1.304 | 2.965 | 7.809 |
| 2A | 34.55 | 0.848 | 7.804 | 2.622 | 6.887 |
| 3A | 40.20 | 0.945 | 1.675 | 3.019 | 7.783 |
| 4A | 39.93 | 0.936 | 1.555 | 3.144 | 8.155 |

Unused, fouled (coked) and laser regenerated samples of Catalyst B were designated as Catalyst 1B, 2B and 3B, respectively. A laser irradiated unused sample of Catalyst B was designated as Catalyst 4B. It should be appreciated that for this Example the used catalyst (Catalyst 2B) was previously regenerated twice. Catalyst 3B (laser regenerated) was prepared by subjecting Catalyst 2B (fouled) to the laser irradiation process described hereinbefore. Prior to chemical and physical analysis, the catalyst was recovered, de-oiled, ground and sieved as described above. The physical characteristics of Catalysts 1B, 2B and 3B were determined by mercury porosimetry and are provided in Table 4. These results indicate the present process can be utilized to substantially or, in some cases, completely restore the total pore volume of the catalyst. It is believed that the loss of total pore area for Catalyst 3B is due substantially to the previous industrial high temperature oxidative regeneration and recycle of the catalyst.

Surface chemical analysis was conducted on Catalysts 1B (unused) and 3B (laser regenerated) using XPS. The results of this analysis are provided in Table 5. As shown in Table 5, these results indicate that laser regeneration of the catalyst did not result in significant

TABLE 5

| SURFACE COMPOSITION (% RELATIVE INTENSITY) DETERMINED BY XPS SPECTROSCOPIC ANALYSIS | | | | | |
|---|---|---|---|---|---|
| Ni-Mo/$\gamma$-$Al_2O_3$ CATALYST | Ni 2p$_{3/2}$ | Mo 3d$_{5/2}$ | Al 2p | O 1s | C 1s |
| 1B. Unused | 0.79 | 3.39 | 31.89 | 55.37 | 8.56 |
| 3B. Laser Regenerated | 0.52 | 3.30 | 31.01 | 52.13 | 14.03* |

*strong C 1s intensity was due to contaminant carbon generated in the XPS vacuum chamber In contrast, the spectrum for Catalyst 2B (fouled), shown in FIG. 7, contains a broad continuum absorption from about 1600 cm$^{-1}$ to about 4000 cm$^{-1}$. The only other absorption bands apparent in the strong absorption spectrum for Catalyst 2B are a band at about 1000 cm$^{-1}$ which, as discussed above, is characteristic of $MoO_3$ and a band at about 1650 cm$^{-1}$ which is characteristic of physically absorbed water. Since it is well known that graphitic materials (e.g. coke) are low bandgap, broad band absorbing species, the broad absorption feature of the FTIR spectrum for Catalyst 2B may be attributed to the carbonaceous material on the catalyst surface.

With reference to FIG. 8, the FTIR spectrum for Catalyst 3B (laser regenerated) is very similar to that for Catalyst 1B (unused; see FIG. 6). The spectrum for Catalyst 3B does not contain a peak shift of the $MoO_3$ characteristic at 1000 cm$^{-1}$. From these results, it is apparent that laser regeneration of a fouled hydroprocessing catalyst does not significantly alter the chemical nature of the original catalyst.

The results of PIXE spectroscopic analysis of Catalysts 1B (unused), 2B (fouled), 3B (laser regenerated) and 4B (laser irradiated unused) are provided in Table 6. These results illustrate that, upon fouling, the catalyst bears relatively reduced amounts of support (i.e. Al) and active (i.e. Mo and Ni) phases—compare Catalyst 1B with Catalyst 2B. This is not unexpected since coke fouling adds mass to the catalyst (i.e. carbon and sulphur) thereby reducing the relative amounts of other catalyst constituents. However, upon regeneration according to the present process, the concentration of the active and support phases of the catalyst are restored. Thus, the present process does not lead to significant changes and/or modifications in the surface concentrations of the active catalytic phases.

TABLE 6

MASS CONCENTRATION (%)
DETERMINED BY PIXE SPECTROSCOPIC ANALYSIS

| Ni-Mo/γ-Al$_2$O$_3$ CATALYST | Al | P | S | Ni | Mo |
|---|---|---|---|---|---|
| 1B | 34.18 | 3.179 | 1.654 | 2.699 | 10.16 |
| 2B | 30.05 | 2.389 | 8.377 | 2.103 | 8.174 |
| 3B | 36.03 | 2.970 | 1.946 | 2.526 | 9.183 |
| 4B | 36.85 | 3.072 | 1.505 | 2.757 | 9.291 |

We claim:

1. A process for regenerating a deactivated hydroprocessing catalyst fouled with carbonaceous material, said process comprising the step of regenerating the catalyst by removing substantially all of said carbonaceous material from said catalyst by exposing said catalyst to laser radiation in the presence of an oxidizing gas, wherein said laser radiation has a wavelength of from about 200 nm to about 10,000 nm, a fluence regime of from about 10 to about 1000 J/cm$^2$ and an intensity of from about 10 W/cm$^2$ to about 1 MW/cm$^2$.

2. The process defined in claim 1, wherein said catalyst is in the form of particles.

3. The process defined in claim 2, wherein said catalyst is agitated during exposure to said laser radiation.

4. The process defined in claim 2, wherein the particle size of said catalyst is 20–50 mesh.

5. The process defined in claim 4, wherein said catalyst is agitated during exposure to said laser radiation.

6. The process defined in claim 1, wherein said oxidizing gas comprises from about 15 to about 25 weight percent of oxygen.

7. The process defined in claim 1, wherein said catalyst is a metal supported on a support material.

8. The process defined in claim 7, wherein said metal is selected from the group comprising iron, chromium, cobalt, nickel, ruthenium, rhodium, palladium, iridium, rhenium and platinum.

9. The process defined in claim 8, wherein said support material is selected from the group comprising alumina, silica, silica-alumina, titania, carbon and cerium oxide.

10. The process defined in claim 1, wherein said catalyst is a metal sulphide supported on a support material.

11. The process defined in claim 10, wherein said metal sulphide is selected from molybdenum sulphide and tunsten sulphide.

12. The process defined in claim 11, wherein said metal sulphide is promoted by a compound selected from nickel sulphide and cobalt sulphide.

13. The process defined in claim 12, wherein said support material is selected from the group comprising alumina, silica, silica-alumina, titania and cerium oxide.

14. The process defined in claim 1, wherein said catalyst is selected from the group comprising hydrotreating catalysts, hydrocracking catalysts, gasoline reforming catalysts, catalysts for selective hydrogenation of pyrolysis gasolines, and catalyst supports used as molecular sieves.

15. The process defined in claim 14, wherein said hydrotreating catalysts are selected from the group comprising hydrodesulphurization catalysts, hydrodenitrogenation catalysts and catalysts for hydrogenation of olefins and aromatics.

16. The process defined in claim 1, wherein said laser radiation is generated from a laser selected from the group comprising CO$_2$, Yag and Excimer.

17. The process defined in claim 1, wherein said laser radiation is generated from a CO$_2$ laser.

18. The process defined in claim 16, wherein said laser is operated in a mode selected from pulsed, continuous wave and pulsed continuous wave.

19. The process defined in claim 17, wherein said CO$_2$ laser is operated in pulsed continuous wave mode.

20. The process defined in claim 1, wherein said catalyst is exposed to said laser radiation for a period of from about 1 microsecond to about 100 milliseconds.

21. The process defined in claim 19, wherein said catalyst is exposed to said laser radiation for a period of from about 100 microseconds to about 10 milliseconds.

22. The process defined in claim 21, wherein said laser radiation comprises a wavelength of from about 1,000 nm to about 10,000 nm.

23. The process defined in claim 19, wherein said laser is operated in a fluence regime of from about 20 to about 100 J/cm$^2$.

* * * * *